June 10, 1941. L. CREMER 2,245,389
COFFEE BREWING APPARATUS
Filed Aug. 5, 1938 2 Sheets-Sheet 1
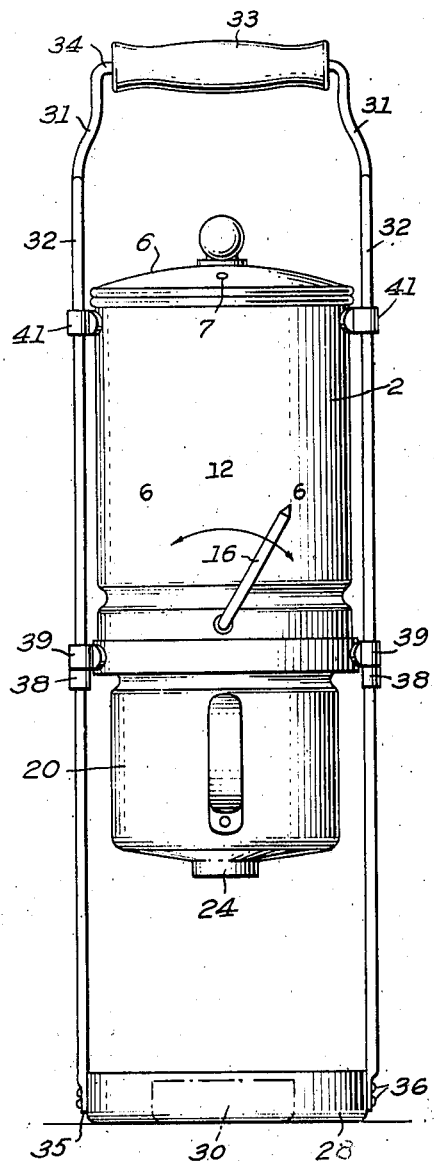
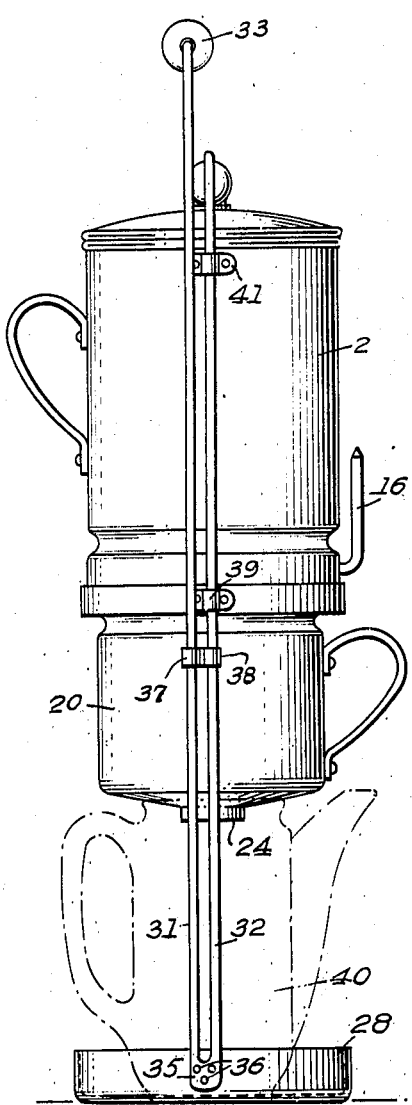
Inventor:
LEONHARD CREMER
By
Attorney.

June 10, 1941.  L. CREMER  2,245,389
COFFEE BREWING APPARATUS
Filed Aug. 5, 1938  2 Sheets-Sheet 2
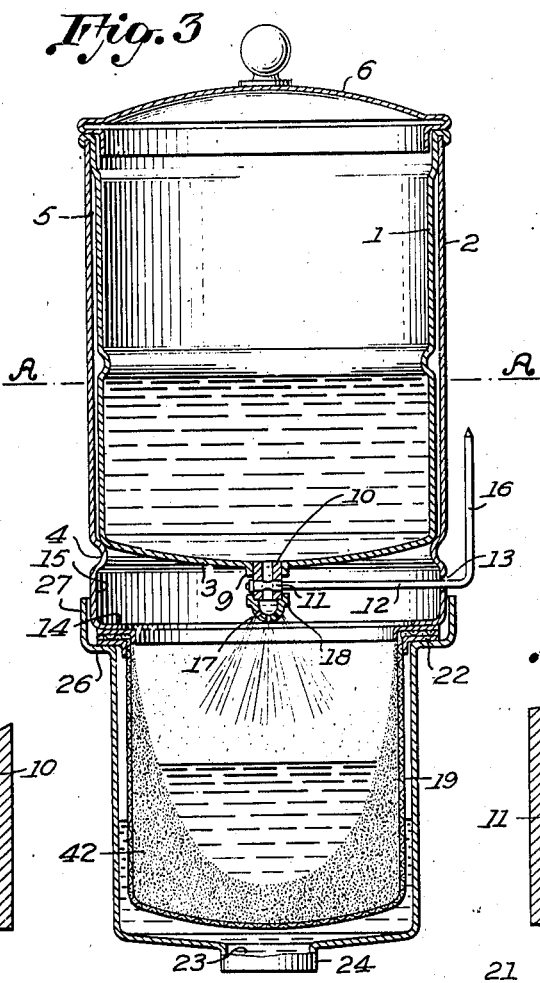
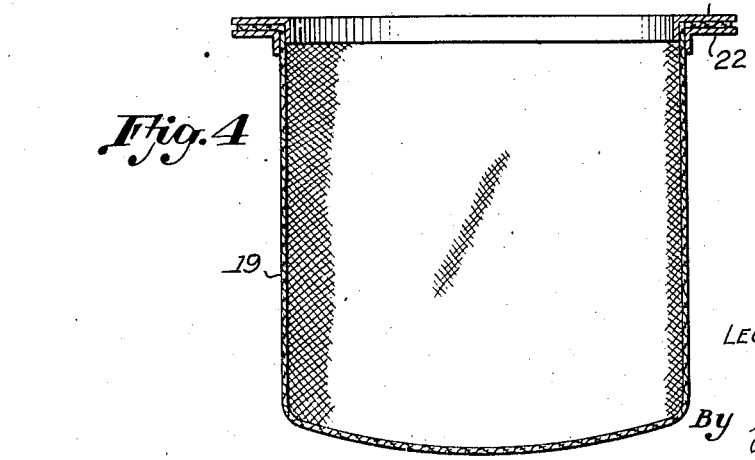
Inventor:
LEONHARD CREMER
By
Attorney.

Patented June 10, 1941

2,245,389

UNITED STATES PATENT OFFICE 2,245,389

COFFEE BREWING APPARATUS

Leonhard Cremer, Bad Kreuznach, Germany

Application August 5, 1938, Serial No. 223,262
In Germany August 18, 1934

5 Claims. (Cl. 53—3)

The invention constitutes a revolution in the preparation of a coffee beverage by scalding ground coffee in that while completely exhausting the ground coffee and preserving the pure coffee aroma, the bitter substances, products of roasting and caffeine are arrested in a purely physical way before passing into the coffee liquor.

The invention consists in that the temperature of the scalding water is reduced from 100° C. to about 91° C. and care is taken that, irrespectively of whether a quantity of coffee beverage for twelve or for six cups is to be prepared, a brewing period of about six minutes is maintained.

If the scalding water comes into contact with the ground coffee to be lixiviated at about 91° C. the caffeine and undesirable constituents of the coffee which are produced during the roasting process and which to-day are generally called products of roasting or by-products, are prevented from being dissolved, as they most certainly would be at a temperature of 100° C. These substances would also be dissolved if the brewing period lasted longer than about six minutes.

Finally the invention is based on the knowledge that the lixiviated coffee grounds, which contain the injurious or undesirable substances must not come into contact with the finished coffee beverage. The known brewing apparatus do not meet this last requirement as, apart from the fact that they use filter sieves and not filter bags as in the invention, the lowermost sieve in the known apparatus is located below the edge of the can intended to receive the coffee beverage, so that as this gradually fills the liquid level finally attains the lowermost sieve with the result that the undesirable substances held back in the coffee grounds up to that point can pass into the finished liquor without hindrance.

Filter sieves cannot solve the problem which the invention has set out to solve, as they clog and thus lead to a protraction of the brewing period, whereas the maintenance of a short brewing period (about six minutes) is essential.

Therefore in the brewing apparatus according to the invention a filter bag is used which is suspended in the vessel in which it is accommodated, so that it hangs freely over the outlet of this vessel and does not project into the beverage can placed thereunder. The upper edge of the bag is clamped between two rings and held in its suspended position so that the scalding water container is placed on the filter vessel by engagement between the clamping rings. As the bag is held merely by being clamped by the rings, it is easily exchangeable and can be easily cleaned after each time of use, which is important for the quality of the coffee beverage. Finally the bag shape of the filter is a determining factor when, as in the case of the invention, the scalding water passes from its container into the filter vessel in the form of a spray. The spray jet whirls up the ground coffee from the bottom of the bag, compels it to rise on the side wall and thus produces a filter layer both on the bottom and also on the side wall of the bag.

A form of construction of the new coffee brewing apparatus is illustrated by way of example in the accompanying drawings, but it is specifically pointed out that the embodiment of the invention is by no way exhausted by this example and can deviate in many details of the apparatus from the form of construction illustrated without departing from the scope of the invention.

Fig. 1 shows in front elevation a brewing apparatus slidably suspended in a stand, Fig. 2 is a side elevation showing the apparatus raised to enable a can to be placed thereunder, Fig. 3 is a longitudinal section through the brewing apparatus removed from the stand, Fig. 4 is a longitudinal section on a larger scale showing the filter bag with clamping device on its edge, Fig. 5 is a section on a larger scale through the shut-off cock in the bottom of the scalding water container in position for preparing a quantity of beverage for twelve cups.

Fig. 6 is a section on a larger scale through the shut-off cock in the bottom of the scalding water container in position for preparing a quantity of beverage for six cups.

The coffee brewing apparatus comprises a double walled scalding water container. The inner wall 1 is rigidly connected at its upper edge to the upper edge of the outer wall 2 and has a bottom 3 whose edge is air-tightly supported by a circumferential groove in the outer wall 2. Thus the hollow space 5 formed between the two walls encloses an air layer preventing the cooling of the scalding water. The scalding water container has on its inner wall a measure. In the example illustrated the container is intended for a filling for the production of coffee beverage for twelve cups and up to the level A for six cups. The container is closed by a lid 6 with steam escapement hole 7 (Fig. 1). At the lowest point of the bottom 3 there is a discharge outlet 9 in which a shut-off cock 10 is fitted. The outer wall 2 has an extension 15, which projects beyond the shut-off cock and is bent over to form an inwardly directed horizontal flange 14. A rod 12 extending through a bore 13 in the extension 15 engages the cone 11 of the shut-off cock and outside the container is bent at right angles to form a vertical arm 16 with pointed end. The arm 16 forms a hand movable over a scale (Fig. 1) provided on the outer side of the wall 2 and indicating the fillings (6 or 12 cups). A cap 18 provided with perforations 17 like a rose, is fitted, for example by screwing, on to the lower edge of the cock housing. The bore of the shut-off cock 10 is such that when the cock is properly adjusted the water poured into the container will run off in about six minutes.

Under the scalding water container 1, 2, 3 there is the brewing vessel 20 which has about half the capacity of the scalding water container. The vessel 20 accommodates a filter bag 19 of thin fabric, such as linen or nettle, and whose upper edge is clamped between two accurately fittings rings 21, 22 of angular cross-section, the bag made of more or less tightly woven material according to requirements and the quantity of ground coffee, is so suspended that it does not reach the outlet 23 of the discharge tube 24 on the bottom of the vessel 20 and consequently cannot enter the can 40 placed under the vessel and shown in dot-dash lines in Fig. 2.

The vessel 20 has at its upper edge an angular flange 26, 27 in which the extension 14, 15 of the outer wall 2 fits snugly and the arm 14 of this extension rests on and tightly presses together the rings 21, 22. This double clamping prevents the filter bag 19 from being pulled out when the brewing apparatus is in use. On the other hand it is possible after each time the apparatus is used to thoroughly clean the filter bag by removing it frome the rings 21, 22, thoroughly boiling it and if necessary replacing it by a new one.

Assembled as above described the brewing apparatus is carried by a stand.

This stand consists of a dish-shaped base 28 for inserting a bowl 30 (shown in dot-dash lines in Fig. 1) for catching any late drops of coffee water or for accommodating a coffee can (Fig. 2). At two diametrically opposite points of the dish-shaped base 28 pairs of rods 31, 32 of different lengths project upwards, the longer rods 31 being connected by a cross bar 34 carrying a handle 33. In the example illustrated the rods 31, 32 of each pair are connected at their lower ends by an end piece 35 which is secured to the base 28 by rivets 36. Collars 37, 38 are fixed on the rods and support the brewing apparatus by eyes 39 projecting from the filter vessel 20 and slidable on the rods 32. The scalding water container 1, 2, 3 is also slidable on the rods 32 by means of eyes 41.

The brewing apparatus operates in the following manner: When the ground coffee 42 has been poured into the filter bag 19 the scalding water container is placed on the vessel 20 which is then moved upwards with the container sufficiently far to allow a coffee can 40 to be placed under the vessel 20 (Fig. 2). The necessary quantity of hot water is then poured into the container 1, 2, 3 and the lid 6 placed in position. Hereupon the cock 10, 11 is accurately adjusted according to the quantity of water poured in—in the example illustrated for six cups (Figs. 1 and 6). The apparatus now operates absolutely automatically.

By the pouring of the boiling water into the container 1, 2, 3 a loss of heat amounting to about 6° C. takes place. The air space 5 prevents further cooling as the entire passage time only amounts to about six minutes. Further loss amounting to about 3° C. takes place during the outflow of the water from the cock 10, 11 into the filter bag 19. The final temperature is therefore, as desired, about 91° C.

Owing to the fact that the water passes out through the spraying head 17, 18 the ground coffee is first whirled up until it is moistened throughout, the liquid level gradually rising in the bag 19. However the higher it rises the weaker will be the outflow of water which consequently forces the whirled up coffee towards the walls of the filter bag 19. Thus a filter layer of ground coffee is formed both on the bottom and also on the walls of the filter bag 19 (Fig. 3). It will be obvious that with this manner of filtering, a thin bag is sufficient which need only be so tight that no particles of dust can pass through it. A thin fabric is also easier to clean than a thick felty one.

The capacity of the filtering vessel is adapted to that of the hot water container so that overflowing cannot occur and the water flows out of the container in about 5½ minutes. About half a minute will elapse before the water has run out of the filter bag as its liquid level will have already dropped owing to the final reduced flow of water. The total filtering operation consequently occupies about six minutes.

This period and the above mentioned temperature (91° C.) are amply sufficient for completely extracting the desired substances from the ground coffee, but are not sufficient to dissolve the injurious substances which consequently remain in the coffee grounds.

I claim:

1. A drip coffee pot comprising a valve controlled hot water container, a housing for placement above a vessel for collecting the infusion, said housing having an opening at its bottom and being provided with a shoulder at its top, a filter bag for the reception of coffee grounds, and a lower and an upper clamping ring arranged in said shoulder, the upper end of said filter bag being inserted in the space between said two clamping rings, the valve controlled hot water container being seated on said upper clamping ring, and the filter bag being suspended within said housing and having its bottom in a level above said opening.

2. A drip coffee pot comprising a hot water container having an outlet in its bottom, a drain-cock arranged in said outlet, a cock-stem, said cock-stem being connected to said cock and being cranked at its free end, a dial being disposed at the outside of said hot water container, said crank being arranged in front of said dial, the figures of said dial indicating the quantity of hot water filled into said container, a housing for placement above a vessel for collecting the infusion, said housing having an opening at its bottom and carrying said hot water container at its top, and a filter bag for the reception of coffee grounds, said filter bag being suspended within said housing and having its bottom in a level above said opening.

3. A drip coffee pot comprising a valve controlled hot water container, a casing distantly surrounding said container, said casing projecting downwards from the bottom of said container and having an internal flange at its lower edge, said hot water container and said casing having circumferential corrugations formed in their walls for holding said container spaced within said casing, a housing for placement above a vessel for collecting the infusion, said housing having an opening at its bottom and being provided with a shoulder at its top, said internal flange of said casing being seated on said shoulder of the housing, and a filter bag for the reception of coffee grounds, said filter bag being suspended within said housing and having its bottom in a level above said opening.

4. A drip coffee pot comprising a valve controlled hot water container, a casing distantly surrounding said container, said casing projecting downwards from the bottom of said container and having an internal flange at its lower edge, said hot water container and said casing having circumferential corrugations formed in their walls for holding said container spaced within said housing, a housing for placement above a vessel for collecting the infusion, said housing having an opening at its bottom and being provided with a shoulder at its top, a filter bag for the reception of coffee grounds, and a lower and an upper clamping ring arranged in said shoulder, the upper end of said filter bag being inserted in the space between the two clamping rings, said internal flange of said casing being seated on said upper clamping ring, and the filter bag being suspended within said housing and having its bottom in a level above said opening.

5. A drip coffee pot comprising a hot water container having on outlet in its bottom, a casing distantly surrounding said container, said casing projecting downwards from the bottom of said container and having an internal flange at its lower edge, said hot water container and said casing having circumferential corrugations formed in their walls for holding said container spaced within said casing, a drain-cock arranged in said outlet of said hot water container, a cock-stem, said cock-stem being connected to said cock and being cranked at its free end, a dial being disposed at the outside of said casing, said crank being arranged in front of said dial, the figures of said dial indicating the quantity of hot water filled into said container, a housing for placement above a vessel for collecting the infusion, said housing having an opening at its bottom and being provided with a shoulder at its top, a filter bag for the reception of coffee grounds, and a lower and an upper clamping ring arranged in said shoulder, the upper end of said filter bag being inserted in the space between said two clamping rings, said internal flange of said casing being seated on said upper clamping ring, and the filter bag being suspended within said housing and having its bottom in a level above said opening.

LEONHARD CREMER.